(12) United States Patent
Trivedi et al.

(10) Patent No.: US 6,745,337 B1
(45) Date of Patent: Jun. 1, 2004

(54) GLITCH DETECTION CIRCUIT FOR OUTPUTTING A SIGNAL INDICATIVE OF A GLITCH ON A STROBE SIGNAL AND INITIALIZING AN EDGE DETECTION CIRCUIT IN RESPONSE TO A CONTROL SIGNAL

(75) Inventors: Romesh B. Trivedi, Orangevale, CA (US); Srinivasan Rajappa, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 09/690,118

(22) Filed: Sep. 29, 2000

(51) Int. Cl.[7] .............................................. G06F 1/12
(52) U.S. Cl. ..................... 713/400; 713/400; 713/401; 713/500; 713/501; 714/724; 714/798; 714/799
(58) Field of Search ................................ 713/400, 401, 713/500, 502; 714/724, 798, 799; 365/233

(56) References Cited

U.S. PATENT DOCUMENTS

| | | | | |
|---|---|---|---|---|
| 4,453,229 A | * | 6/1984 | Schaire | 710/109 |
| 4,578,666 A | * | 3/1986 | Anderson | 340/146.2 |
| 6,094,376 A | * | 7/2000 | Park et al. | 365/189.05 |
| 6,115,322 A | * | 9/2000 | Kanda et al. | 365/233 |
| 6,401,225 B1 | * | 6/2002 | Miura | 714/724 |
| 6,530,029 B1 | * | 3/2003 | Metchev | 713/500 |
| 6,552,945 B2 | * | 4/2003 | Cooper et al. | 365/212 |

FOREIGN PATENT DOCUMENTS

JP         62128643 A   *  6/1987   .......... H04L/13/00

OTHER PUBLICATIONS

Park, H.–C. et al.; "A 833 Mbps 2.5 V 4 Mb double data rate SRAM", Solid–State Circuits Conference, 1998. Digest of Technica Papers. 45th ISSCC 1998 IEEE International , Feb. 5–7, 1998, Page(s): 356–357, 464.*

* cited by examiner

Primary Examiner—Thomas Lee
Assistant Examiner—James K. Trujillo
(74) Attorney, Agent, or Firm—Blakely, Sokoloff, Taylor & Zafman LLP (57) ABSTRACT

A glitch detection circuit is described for detecting a glitch on a strobe signal transmitted over a single strobe interface. The glitch detection circuit includes a first input terminal to receive a single strobe signal and a second input terminal to receive a protocol control signal. The glitch detection circuit uses a double edge detection circuit to detect two consecutive rising or falling edges on the strobe signal. The double edge detection circuit becomes initialized by an initializing circuit each time the logical state of the control signal changes from a first state to a second state. The glitch detection circuit is configured to output a glitch detection signal when two consecutive rising or falling edges are detected by the double edge detection circuit before being initialized by the initializing circuit.

21 Claims, 5 Drawing Sheets

GLITCH DETECTION CIRCUIT FOR OUTPUTTING A SIGNAL INDICATIVE OF A GLITCH ON A STROBE SIGNAL AND INITIALIZING AN EDGE DETECTION CIRCUIT IN RESPONSE TO A CONTROL SIGNAL

BACKGROUND OF THE INVENTION

1. Field of the Invention

The present invention generally relates to signal transmissions, and in particular, to a glitch detection circuit for a single strobe interface.

2. Description of the Related Art

In computer systems, source synchronous interfaces may be used to increase the speed of communication between components, such as processors, memories and I/O devices. Generally, there are two types of source synchronous interfaces, namely a differential strobe scheme and a single strobe scheme. In a differential strobe source synchronous interface, data or address signals are sent from a transmitter to a receiver are accompanied by a pair of complementary strobe signals.

Alternatively, in a single strobe source synchronous interface, data or address signals are accompanied by a single strobe signal. The strobe is a signal used by a receiver to latch the accompanying address or data, or for other timing purposes. Typically, both strobe transitions, rising and falling, are used, in the single strobe scheme, by the receiver to identify and latch the correct packet of data. Thus, during the first transition of strobe signal (e.g., rising), the receiver will latch the first packet of data, and during the second transition of strobe signal (e.g., falling), the receiver will latch the next packet of data, and so on.

Occasionally, strobe signals of single strobe source synchronous interfaces may experience glitches that can cause problems in a computer system, since the glitch may latch onto invalid address or data. Typically, if a failure or error occurs due to a glitch on the strobe signal, it is difficult to identify the cause and time of error. Currently, there is no effective way in which a glitch on a single strobe interface can be detected.

DETAILED DESCRIPTION OF THE INVENTION

Implementations of the present invention are described herein for purposes of illustration, namely a circuit to detect presence of glitches on a single strobe interface. According to one aspect of the present invention, the glitch detection circuit is implemented using double edge detection circuit(s) to detect two consecutive transitional edges of a single strobe signal. According to another aspect of the present invention, a protocol control signal on a bus that specifies whether the bus has a valid data or address is used to reset the double edge detection circuit(s) in such a way that if the double edge detection circuit detects two rising or falling transitional edges on the strobe signal before a transitional edge on the protocol control signal is asserted from a first level to a second level, the output of the glitch detection circuit will signal an occurrence of a glitch.

Figure 1:
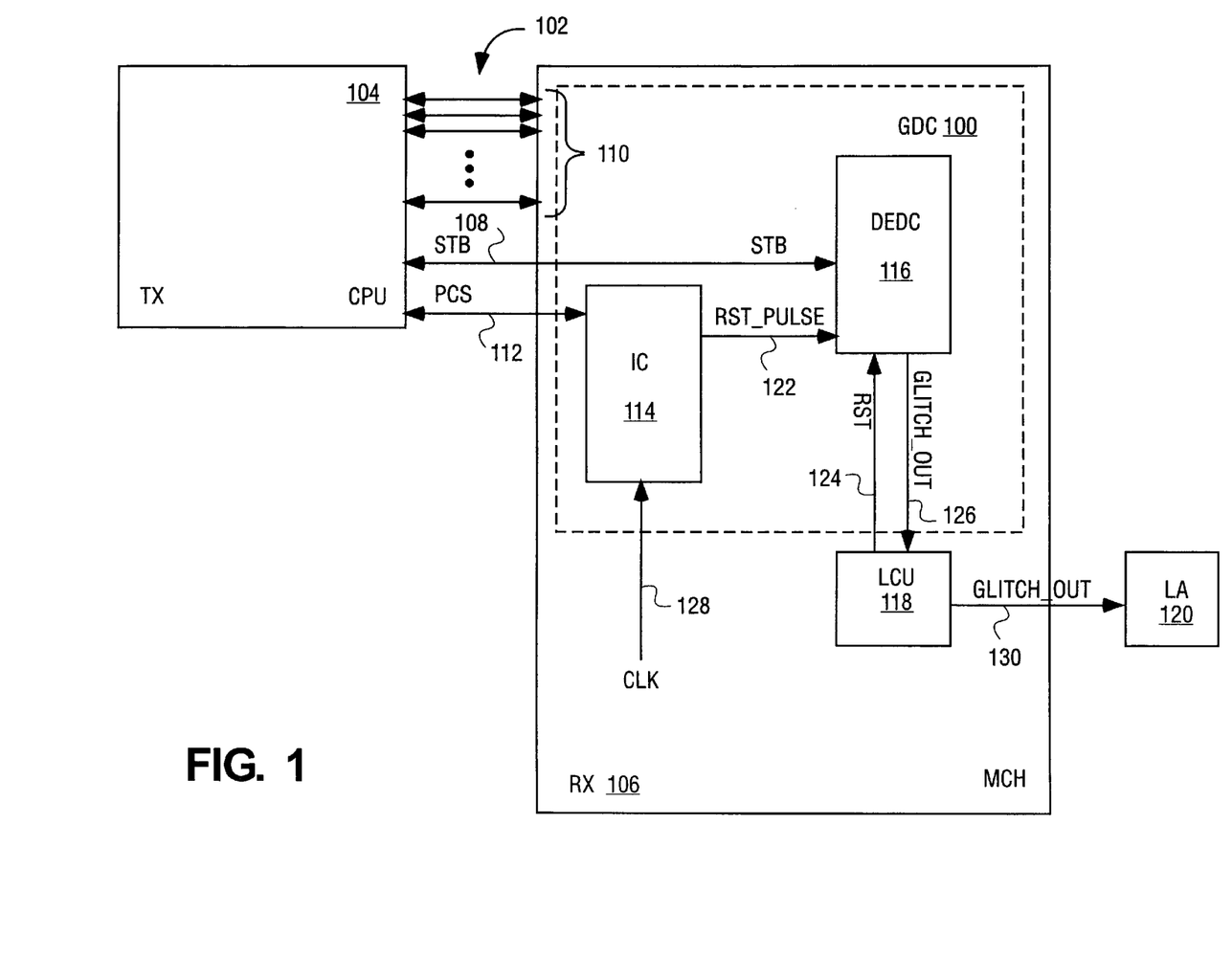
FIG. 1 is a block diagram of a glitch detection circuit incorporated into a single strobe interface according to one embodiment of the present invention.

FIG. 1 depicts a simplified representation of a glitch detection circuit 100 incorporated into a single strobe interface system according to one embodiment of the present invention. The glitch detection circuit (GDC) 100 according to the invention has various possible applications. For example, the glitch detection circuit 100 can be used to detect a glitch in any single strobe interface, including address bus, accelerated graphics port or any other single-strobe type source synchronous interfaces.

The system includes a transmitter (TX) 104 (e.g., processor, controller, I/O device) and a receiver (RX) 106 (e.g., processor, controller, I/O device). While one agent is shown as a transmitter and the other agent is shown as a receiver, both agents are capable of transmitting and receiving signals to and from each other. The transmitter 104 is in communication with the receiver 106 via a single strobe interface 102. In a single strobe interface 102, a single strobe signal (STB) 108 is transmitted along with data or address signals 110. The strobe signal 108 is used by the receiver 106 to latch the data or address signals 110 transmitted by the transmitter 104. The data or address signals 110 are also accompanied by a protocol control signal (PCS) 112 that indicates whether or not the bus has valid address or data. The protocol control signal 112 is used by the present invention to reset the glitch detection circuit 100 during normal operations when a glitch is not present on the strobe signal 108.

The glitch detection circuit 100 generally comprises an initializing circuit (IC) 114 having an input terminal to receive the protocol control signal 112 and at least one double edge detection circuit (DEDC) 116 having a first input terminal to receive the single strobe signal 108 and a second input terminal to receive a reset pulse (rst_pulse) 112 produced by the initializing circuit 114. The double edge detection circuit 116 also has an output terminal coupled with a logical control unit 118. In one implementation, the logical control unit 118 is a logical unit incorporated into the receiver 106 to control flow of data to and from the single strobe interface 102. The logical control unit 118 is configured to receive a glitch detection signal (glitch_out) 126 and transmit a reset signal (RST) 124 to reset the glitch detection circuit 100. In one embodiment, the glitch detection circuit 100, after it detects a glitch, is configured to be unresponsive to any subsequent input signals (STB and rst_pulse) until the glitch detection circuit 100 receives a reset signal (RST) 124 from the logical control unit 118 to clear the flip-flops FF1 through FF4.

In one implementation, the transmitter 104 is a processor (CPU) and the receiver 106 is a memory controller hub (MCH). The single strobe interface 102 is an address bus, which is a part of a processor bus providing a communications link between the processor 104 and the memory controller hub 106. When the processor 104 makes a memory access request (e.g., read, write), a specific address is forwarded to the memory controller hub 106 to read or write from a particular address location of the memory. The address signals transmitted by the processor 104 are accompanied by a strobe signal 108 that acts as a clock for latching onto the address signals and a protocol control signal 112 that indicates whether or not the bus has valid address.

During use, if there is a glitch on the strobe signal 108, there is a chance that the receiving agent (memory controller hub) may latch onto a wrong data or address. If the receiving agent latches onto a wrong data or address, there is a chance that the system might hang or there might be some error in the system. Accordingly, the glitch detection circuit 100 of the present invention may be used to continuously sample the strobe signal 108 to detect a presence of a glitch. Once a glitch has been detected, the glitch detection circuit 100 will flag an error to a logical control unit (LCU) 118. The LCU 118 may in turn flag an error to a logic analyzer (LA) 120 indicating that a glitch has occurred at a particular time. In this regard, a user debugging the system may use the information provided by the glitch detection circuit 100 to determine the cause of the glitch and to carry out other debugging tasks. Although the glitch detector monitors a single strobe type address bus in this implementation, it should be understood that the features of the present invention may be applied to any other source synchronous scheme that uses a single strobe, including a processor bus, a data bus, a memory bus and an accelerated graphics port.

Figure 2:
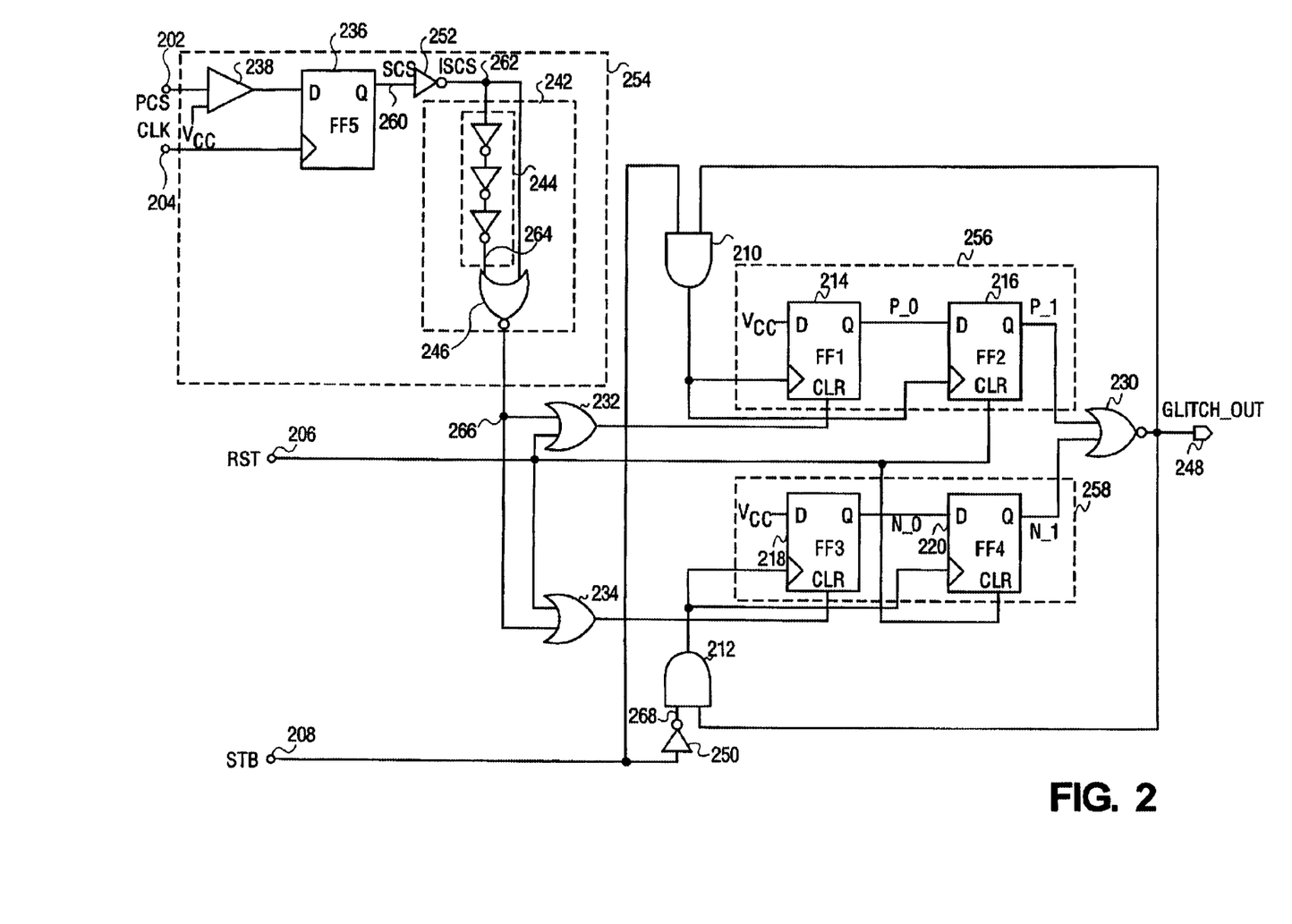
FIG. 2 is a schematic diagram of a glitch detection circuit for a single strobe interface according to one embodiment of the present invention.

FIG. 2 depicts a schematic diagram of a glitch detection circuit for a single strobe interface according to one embodiment of the present invention. In this embodiment, the glitch detection circuit generally includes first and second double edge detection circuits 256, 258 and an initializing circuit 254. The initializing circuit 254 comprises a differential amplifier 238, a D-type flip-flop (FF5) 236, an inverter 252 and a pulse generator 242. The differential amplifier 238 includes an input terminal 202 for receiving a protocol control signal (PCS) 202. The FF5 236 includes a data input (D) terminal connected to the output terminal of the differential amplifier 238, a clock input terminal connected to receive a clock signal (CLK) 204 applied thereto and an output (Q) terminal for outputting a synchronized control signal (SCS) 260 corresponding to the protocol control signal synchronized by clock signal 204. In other words, the logical state (high or low) at the data input (D) terminal of FF5 236 is transferred to the output (Q) terminal on the active edge (e.g., rising edge) of the clock signal 204.

The SCS 260 outputted by FF5 236 is logically inverted by an inverter 252 to provide a inverted synchronized control signal (ISCS) 262. The pulse generator 242 receives the ISCS 262 and converts the ISCS 262 into a reset pulse (rst_pulse) 266 at each falling edge of the ISCS signal. The pulse generator 242 comprises an inverting delay chain 244 and a NOR gate 246. The ISCS 262 is connected to the inverting delay chain 244 which functions to delay and invert the ISCS 262 before the signal is outputted to one of the inputs of the NOR gate 246. The other input of the NOR gate 246 is connected directly to the ISCS 262. By logically combining the ISCS 262 with the delayed and inverted ISCS (DISCS#) 264 using the NOR gate 246, a reset pulse (rst_pulse) 266 is produced at each falling edge of the ISCS signal.

As mentioned earlier, in this embodiment, the glitch detection circuit utilizes a pair of double edge detection circuits, wherein the first double edge detection circuit 256 detects glitches on the rising edge of the strobe signal and the second double edge detection circuit 258 detects glitches on the falling edge of the strobe signal. The first double edge detection circuit 256 comprises two D-type flip-flops FF1 214 and FF2 216. FF1 contains a data input (D) terminal which is coupled to a voltage source $V_{CC}$ and constantly remains at a logical high state, a clock input terminal for receiving a strobe signal 208 and an output (Q) terminal coupled to a data input (D) terminal of FF2. An AND gate 210 is used to assert a signal, corresponding to the result of logically combining (Boolean AND) an output of the glitch detection circuit (glitch_out) 248 and the strobe signal 208, at the clock input terminals of both FF1 and FF2. In this regard, the AND gate 210 has one input terminal connected to the output 248 of the glitch detection circuit and the other input terminal connected to receive the strobe signal 208 and an output terminal connected to the clock input terminals of FF1 and FF2. Additionally, an OR gate 232 is used to assert a signal, corresponding to the result of logically combining (Boolean OR) the reset pulse (rst_pulse) 266 and a reset signal (RST) 206 from the logical control unit, at a clear input (CLR) terminal of FF1.

The second double edge detection circuit 258 is similarly comprised of two D-type flip-flops FF3 218 and FF4 220 connected in series with the data input (D) terminal of FF4 connected to the output (Q) terminal of FF3. An AND gate 212 is used to assert a signal, corresponding to the result of logically combining (Boolean AND) the output 248 of the glitch detection circuit and an inverted strobe signal 268, at the clock input terminals of both FF3 and FF4. In this regard, the AND gate 212 has one input terminal connected to the output 248 of the glitch detection circuit and the other input terminal connected to receive the inverted strobe signal 268 via an inverter 250 and an output terminal connected to the clock input terminals of FF3 and FF4. Additionally, an OR gate 234 is used to assert a signal, corresponding to the result of logically combining (Boolean OR) the reset pulse 266 and a reset signal 206 from the logical control unit, at the clear input (CLR) terminal of FF3.

In the illustrated embodiment, a NOR gate 230 is incorporated into the glitch detection circuit to logically combine the results of the double edge detection circuits 256, 258. In this regard, the NOR gate 230 has one input terminal connected to the output (Q) terminal of FF2, the other input terminal connected to the output (Q) terminal of FF4 and an output terminal for outputting a glitch detection signal.

When the system is turned on or reset, a reset signal (RST) 206 is provided at the reset input to clear the flip-flops, FF1 through FF4. Accordingly, the output (Q) terminals of FF1 through FF4 (p_0, p_1, n_0 and n_1) will all initially be in a logical low state. Thus, with both inputs (p_1 and n_1) of the NOR gate 230 initially set low, a high is asserted at the output of the NOR gate 230 (glitch_out), forcing one input of each AND gates 210 and 212 to be asserted high. It follows that if the strobe signal (STB) 208 goes from low to high, the output of the AND gate 210 will assert a logic high at the clock input of FF1. In one embodiment, the flip-flops FF1–FF5 are D-type rising-edge flip-flops. Thus, at a first rising edge of the clock input of FF1, the logic high asserted at the data input (D) terminal of FF1 is transferred to its output (Q) terminal, causing p_0 to be in a logical high state. It follows that in the absence of a reset pulse (rst_pulse) 266 at the clear input (CLR) terminal of FF1, a second low-to-high transition of the strobe signal (STB) 208 causes low-to-high transition at the clock input terminal of FF2, forcing the logic high asserted at the data input (D) terminal of FF2 to be transferred to its output (Q) terminal. This causes p_1 to go high, asserting a logic high at one input of the NOR gate 230, causing its output to go low. This causes the output 248 of the glitch detection circuit to go low to indicate that a glitch has been detected. Therefore, if two consecutive low-to-high transition is asserted at the data input (D) terminals of FF1 and FF2 by the strobe signal (STB) 208 before the FF1 is cleared by a reset pulse (rst_pulse) 266 asserted at the clear input (CLR) terminal of FF1, the first double edge detection circuit 256 will output a logic high to signal a detection of a glitch.

Similarly, the second double edge detection circuit 258 will detect two consecutive falling edges of the strobe signal (STB) 208. Thus, in the absence of a reset pulse (rst_pulse) 266 asserted at the clear input (CLR) terminal of FF3, two consecutive high-to-low transitions of the strobe signal (STB) 208 will assert two consecutive low-to-high transitions at the clock input terminals of FF3 and FF4. The first low-to-high transition asserted at the clock input of FF3 forces the logic high asserted at the data input (D) terminal of FF3 to be transferred to the data input (D) terminal of FF4 and the second low-to-high transition asserted at the clock input of FF4 forces the logic high asserted at the data input (D) terminal of FF4 (n_0) to be transferred to the output (Q) terminal (n_1). Accordingly, if two consecutive falling edges are asserted by the strobe signal before the FF3 is cleared by a reset pulse (rst_pulse) 266 at the clear input (CLR) terminal of FF3, the second double edge detection circuit 258 will output a logic high to signal a detection of a glitch.

In the illustrated embodiment, once a glitch has been detected, the AND gates 210 and 212 functions to hold the glitch detection circuit in a frozen state until a reset signal (RST) 206 is received from a logical control unit. The reset signal (RST) 206 from the logical control unit serves to clear the flip-flops FF1–FF4.

If there are no glitches on the signal strobe signal (STB) 208, a falling edge of the inverted synchronized control signal (ISCS) 262 is provided between two falling edges of strobe signal (STB) 208 or between two valid rising edges of strobe signal (STB) 208, causing a reset pulse (rst_pulse) to be generated and thereby clearing the flip-flops FF1 and FF3 of the double edge detection circuits 256, 258. Therefore, the logical state of p_0 and n_0 will be set to a logical low state each time the glitch detection circuit senses a falling edge of ISCS 262 before the presence of two falling edges or two rising edges of the strobe signal are detected by the double edge detection circuits.

Figure 3:
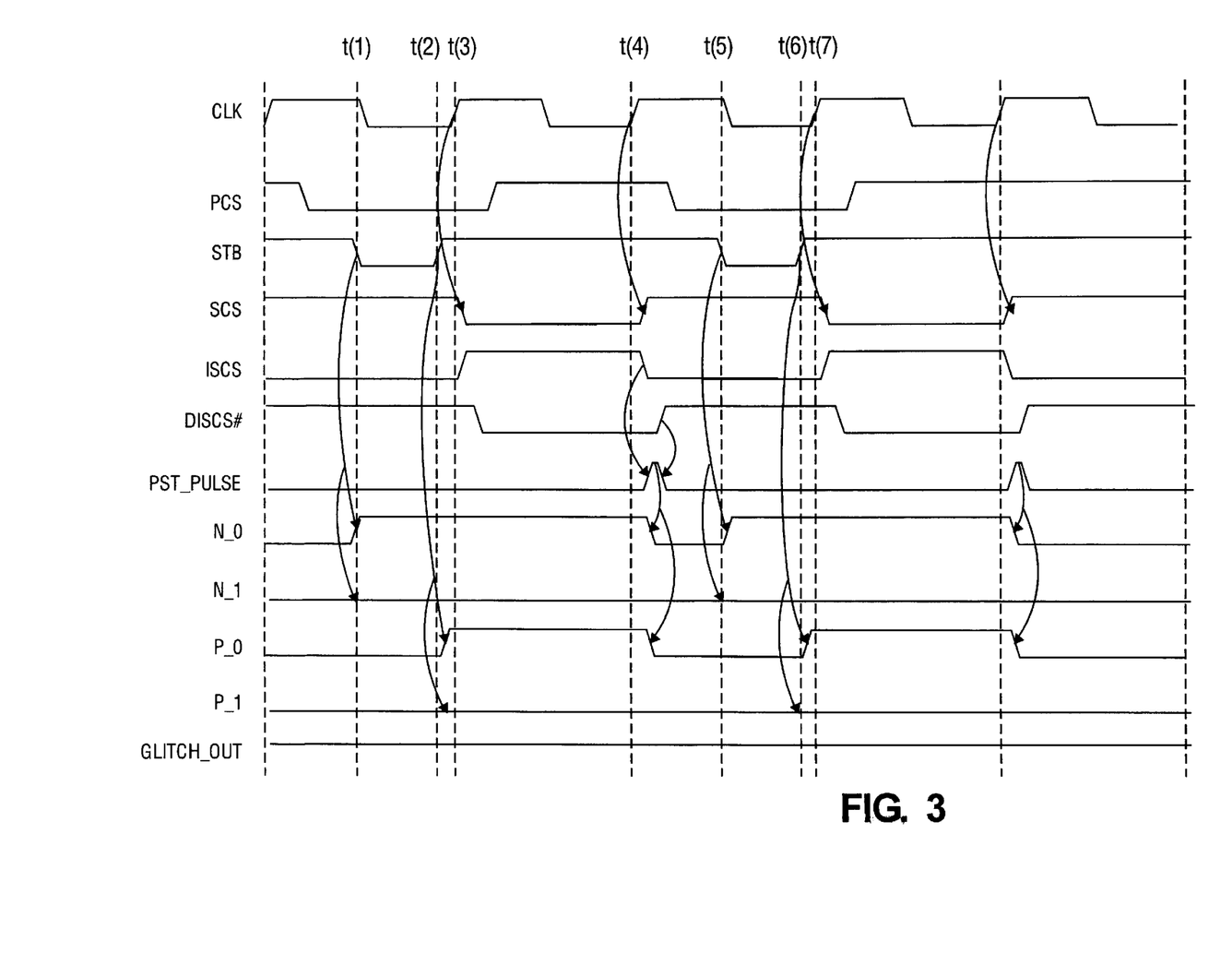
FIG. 3 is a timing diagram of the glitch detection of FIG. 2 during a normal operation.

The operation of the glitch detection circuit will now be described in more detail with reference to FIGS. 3 and 4. The timing diagram in FIG. 3 depicts operations of the glitch detection circuit during a time period when a glitch is not present on a strobe signal (STB). Prior to t(1), assume that output (Q) terminals of the flip-flops FF1–FF4 (p_0, p_1, n_0 and n_1) are all initially in a logical low state and the output of the glitch detection circuit (glitch_out) 248 is in a logical high state to indicate that a glitch has not been detected. At a time t(1), the strobe signal (STB) goes from high to low and, hence, the clock input terminal of FF3 go from low to high, causing the output (Q) terminal of FF3 (n_0) to change state from low to high. Then at a time t(2), the strobe signal goes high, this low-to-high transitional edge causes the output (Q) terminal of FF1 (p_0) to change state from low to high.

Then at a time t(3), when the clock signal (CLK) goes from low to high, the logical low state of the protocol control signal (PCS) is transferred to the output (Q) terminal of the FF5, causing the synchronized control signal (SCS) to go from high to low. When the SCS goes low, the inverter 252 drives its output (ISCS) high. Short time later, the inverted synchronized control signal (ISCS) 262 drives the output of the inverting delay chain 264 low (DISCS#). Note that the output of the NOR gate 246 remains at a logical low state during the high-to-low transition of the SCS since at least one of the inputs of the NOR gate 246 remains high. Then at a time t(4), when the CLK goes from low to high, the logical high state of PCS is transferred to the output (Q) terminal of FF5, causing SCS to go from low to high, causing the inverter 252 to drive its output (ISCS) low. This in turn causes the output of the inverting delay chain 264 (DISCS#) to become high, short time later. When both inputs of the NOR gate 246 are low, the output thereof goes high momentarily, causing a reset pulse (rst_pulse) to be produced. In other words, by logically combining ISCS with DISCS# using the NOR gate 246, a rst_pulse is generated at each rising edge of the synchronized control signal (SCS).

When the reset pulse (rst_pulse) goes high response to clock signal (CLK) going high at t(4) while the PCS is high, this causes FF1 and FF3 to reset and the output (Q) terminals (n_0 and p_0) will go low. Note that during the time period between t(3) and t(4) when input (D) terminals of both FF2 and FF4 are at a logical high state, if another transitional edge of the strobe signal (STB) is detected by one of the double edge detection circuits before FF1 and FF2 are reset by a reset pulse (rst_pulse) produced by the initialization circuit 254, the output of the glitch detection circuit (glitch_out) 248 will change its state from high to low, signaling a presence of a glitch.

Figure 4:
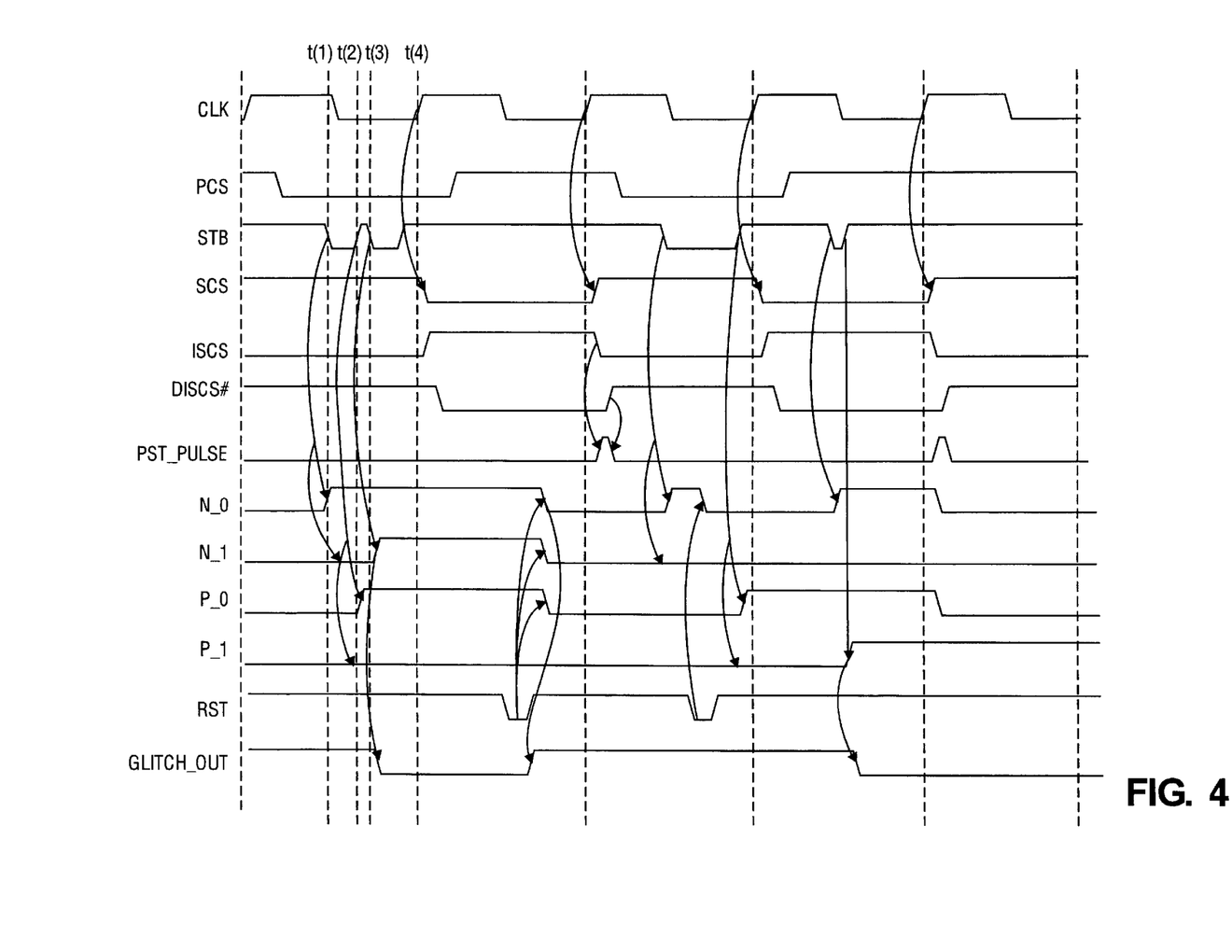
FIG. 4 is a timing diagram of the glitch detection circuit of FIG. 2 during a glitched strobe operation.

Referring now to FIG. 4, a timing diagram depicts operations of the glitch detection circuit in the presence of a glitch on a strobe signal. At a time t(1), when the strobe signal (STB) goes from high to low, the clock input terminal of FF3 goes high, causing the output (Q) terminal of FF3 (n_0) to change its state from low to high. Then at a time t(2), the strobe signal (STB) goes high, this low-to-high transitional edge causes the output (Q) terminal of FF1 (p_0) to change state from low to high. Then at a time t(3), the strobe signal (STB) goes high again, causing the clock input terminals of both FF3 and FF4 to go high, causing the output (Q) terminals of both FF3 (n_0) and FF4 (n_1) to change state from low high. At this point, the output of the glitch detection circuit (glitch_out) changes its state from high to low to indicate the presence of a glitch.

In other words, in the absence of a reset pulse (rst_pulse) generated by the initializing circuit 254, a logic high at the data input (D) terminal of FF4 asserts a logic high at its output (Q) terminal (n_1) in response to a second consecutive falling transitional edge of the strobe signal (STB), forcing the output of the NOR gate 230 to low. Alternatively, in the absence of a reset pulse generated by the initializing circuit, a logic high at the data input (D) terminal of FF2 asserts a logic high at its output (Q) terminal (p_1) in response to a second consecutive rising transitional edge of the strobe signal (STB), forcing the output of the NOR gate 230 to low. Once a glitch is detected, the glitch detection circuit will flag an error and the circuit will freeze until a reset signal is set by a logical control unit. The double edge detection circuits are disabled, after a glitch has been detected, since one input terminal of each AND gates 210 and 212 will receive a logic low from the output of the glitch detection circuit (glitch_out) 248.

Figure 5:
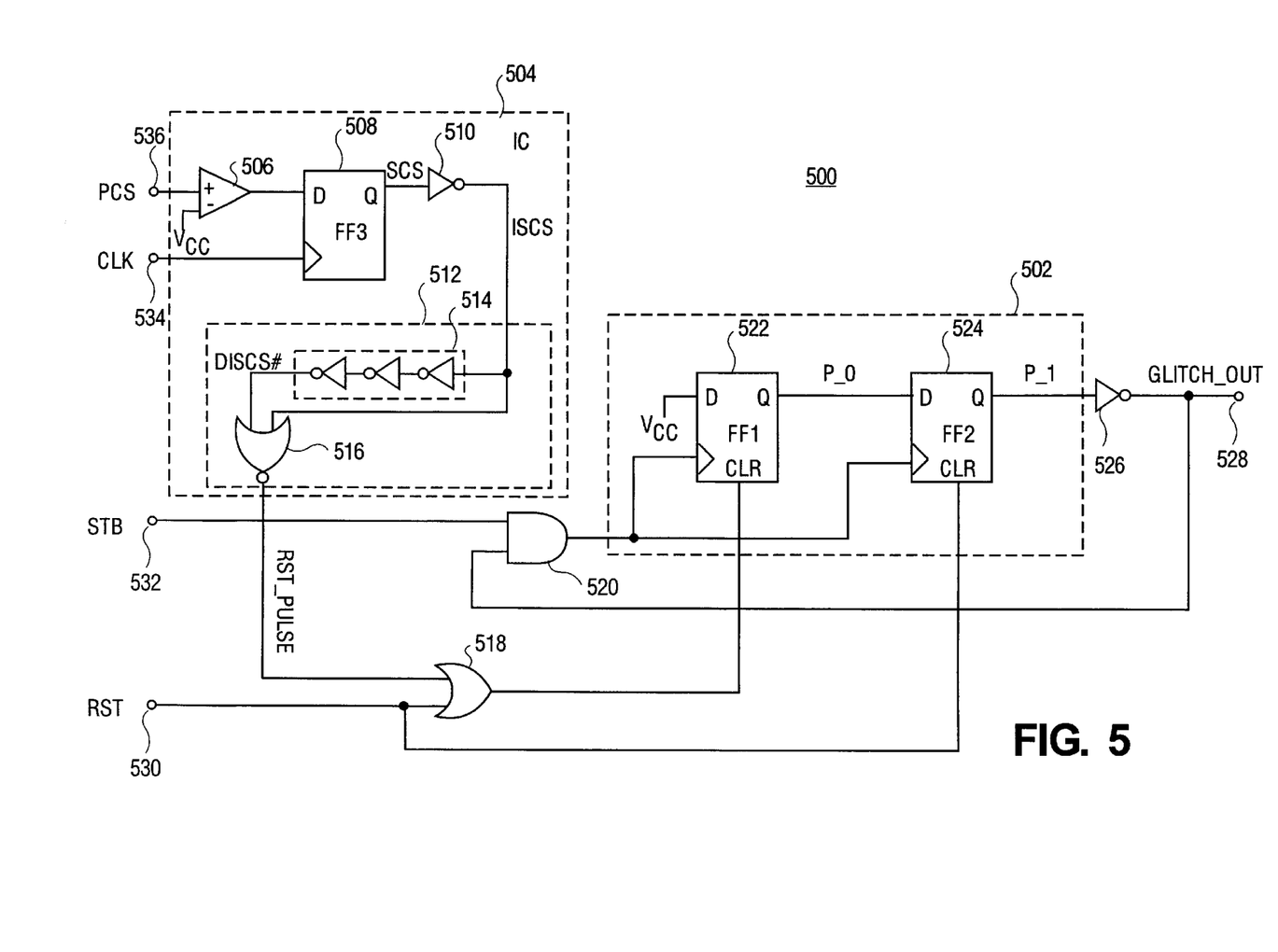
FIG. 5 is a schematic diagram of a glitch detection circuit for a single strobe interface according to another embodiment of the present invention.

FIG. 5 depicts a schematic diagram of a glitch detection circuit 500 for a single strobe interface according to another embodiment of the present invention. In this embodiment, the glitch detection circuit 500 generally includes a double edge detection circuit 502 and an initializing circuit 504. As noted earlier, the initializing circuit 504 includes a differential amplifier 506, a D-type flip-flop (FF3) 508, an inverter 510 and a pulse generator 512. The pulse generator 512 comprises an inverting delay chain 514 and a NOR gate 516. In this embodiment, only one double edge detection circuit 502 is incorporated into the glitch detection circuit 500 to detect a glitch on a rising transitional edge of the single strobe signal (STB) 532. However, it should be understood that the glitch detection circuit 500 of this embodiment could easily be modified to detect a glitch on a falling transitional edge of the strobe signal. The double edge detection circuit 502 comprises two D-type flip-flops FF1 522 and FF2 524. FF1 contains a data input (D) terminal which is coupled to a voltage source $V_{CC}$ and constantly remains at a logical high state, a clock input terminal for receiving the strobe signal (STB) 532 and a output (Q) terminal coupled to a data input (D) terminal of FF2. An AND gate 520 is used to assert a signal, corresponding to the result of logically (Boolean AND) combining the output of the glitch detection circuit (glitch_out) 528 and the strobe signal (STB), at the clock input terminals of both FF1 and FF2. In this regard, the AND gate 520 has one input terminal connected to the output 528 of the glitch detection circuit and the other input terminal connected to receive the single strobe signal and an output terminal connected to the clock input terminals of FF1 and FF2. Additionally, an OR gate 518 is used to assert a signal, corresponding to the result of logically (Boolean OR) combining a reset pulse (rst_pulse) from the initializing circuit 508 and a reset signal (RST) 530, at the clear input (CLR) terminal of FF1.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A circuit comprising:
    a first input terminal to receive a strobe signal;
    a second input terminal to receive a control signal;
    a double edge detection circuit to detect two transitional edges of said strobe signal from a first logic level to a second logic level, or vice versa; and
    an initializing circuit to initialize said double edge detection circuit in response to a change of the control signal from a first logic level to a second logic level, or vice versa, wherein said double edge detection circuit detects a glitch when said two transitional edges of said strobe signal are detected before the double edge detection circuit is initialized by said initializing circuit.

2. The circuit of claim 1, wherein said control signal is a signal on a bus that specifies whether the bus has a valid data or address.

3. The circuit of claim 1, wherein said initializing circuit comprises a flip-flop having an input terminal operatively coupled to receive said control signal, a clock input terminal coupled to receive a clock signal and an output terminal to output a synchronized control signal.

4. The circuit of claim 3, wherein said initializing circuit further comprises a pulse generator coupled to receive said synchronized control signal and output a reset pulse at each occurrence of a transitional edge of said synchronized control signal from a first level to a second level.

5. The circuit of claim 1, wherein said double edge detection circuit comprises a first flip-flop having an input terminal set to one logical state, a clock input terminal to receive said strobe signal and a clear input coupled to receive a reset signal from said initializing circuit, and a second flip-flop having an input terminal coupled to an output terminal of said first flip-flop and a clock input terminal to receive said strobe signal.

6. A circuit comprising:
    a first input terminal to receive a strobe signal;
    a second input terminal to receive a control signal;
    a first double edge detection circuit to detect two consecutive rising edges of said strobe signal;
    a second double edge detection circuit to detect two consecutive falling edges of said strobe signal; and
    an initializing circuit to initialize said first and second double edge detection circuits in response to a change of said control signal from a first level to a second level, wherein at least one of said first and second double edge detection circuits detect a glitch when said two consecutive rising or falling edges of said strobe signal are detected before the double edge detection circuits are initialized by said initializing circuit.

7. The circuit of claim 6, wherein said control signal is a signal on a bus that specifies whether the bus has a valid data or address.

8. The circuit of claim 6, wherein said initializing circuit comprises a flip-flop having an input terminal operatively coupled to receive said control signal, a clock input terminal coupled to receive a clock signal and an output terminal to output a synchronized control signal.

9. The circuit of claim 8, wherein said initializing circuit further comprises a pulse generator coupled to receive said synchronized control signal and output a reset pulse at each occurrence of a transitional edge of said synchronized control signal from a first level to a second level.

10. The circuit of claim 6, wherein said first double edge detection circuit comprises a first flip-flop having an input terminal set to one logical state, a clock input terminal to receive said strobe signal and a clear input coupled to receive a reset signal from said initializing circuit, and a second flip-flop having an input terminal coupled to an output terminal of said first flip-flop and a clock input terminal to receive said strobe signal; and
    said second double edge detection circuit comprises a first flip-flop having an input terminal set to one logical state, a clock input terminal to receive an inverted strobe signal and a clear input coupled to receive a reset signal from said initializing circuit, and a second flip-flop having an input terminal coupled to an output terminal of said first flip-flop and a clock input terminal to receive said inverted strobe signal.

11. A system comprising:
    a first agent;
    a second agent;
    a strobe interface coupled between said first agent and said second agent; and
    a glitch detection circuit incorporated into said second agent, wherein said glitch detection circuit is responsive to a strobe signal transmitted from said first agent to said second agent and outputs an output signal indicative of presence of a glitch on said strobe signal;
    wherein said glitch detection circuit comprises:
        a first input terminal to receive said strobe signal;
        a second input terminal to receive a control signal on a bus that specifies whether the bus has a valid data or address;
        a double edge detection circuit to detect two consecutive rising or falling edges of said strobe signal; and
        an initializing circuit to initialize said double edge detection circuit in response to a change of the control signal from a first level to a second level.

12. The system of claim 11, further comprising a logical control unit coupled to said glitch detection circuit to receive a glitch detection signal and transmit a reset signal to reset said glitch detection circuit.

13. A glitch detection circuit comprising:

first edge detection means for detecting a first transitional edge of a strobe signal from a first logic level to a second logic level, wherein an output of said first edge detection means changes from a first logic level to a second logic level to indicate detection of said first transitional edge;

second edge detection means for detecting a second transitional edge of said strobe signal from said first logic level to said second logic level, wherein an output of said second edge detecting means changes from a first logic level to a second logic level to indicate detection of a glitch in response to detection of said second transitional edge; and initializing means for initializing said first edge detecting means in response to a change of a control signal from a first level to a second level, or vice versa, to change the output of said first edge detection means to said first logic level.

14. The glitch detection circuit of claim 13, wherein said control signal is a signal on a bus that specifies whether the bus has a valid data or address.

15. The glitch detection circuit of claim 13, wherein said initializing means is a D-type flip-flop having an input terminal operatively coupled to receive said control signal, said D-type flip flop configured to output a synchronized control signal corresponding to the control signal synchronized by a clock signal changing from a first logic level to a second logic level.

16. The glitch detection circuit of claim 13, wherein said double edge detection means comprises a first flip-flop having an input terminal set to one logical state, a clock input terminal to receive said strobe signal and a clear input coupled to receive a reset signal from said initializing means, and a second flip-flop having an input terminal coupled to an output terminal of said first flip-flop and a clock input terminal to receive said strobe signal.

17. A glitch detector comprising:

a first edge detector to detect a first transitional edge of a strobe signal from a first logic level to a second logic level, wherein an output of the first edge detector changes from a first logic level to a second logic level to indicate detection of the first transitional edge;

a second edge detector to detect a second transitional edge of the strobe signal from the first logic level to the second logic level, wherein an output of the second edge detector changes from a first logic level to a second logic level to indicate detection of a glitch in response to detection of the second transitional edge; and an initializer to initialize the first edge detector in response to a change of a control signal from a first level to a second level, or vice versa, to change the output of the first edge detector to the first logic level.

18. The glitch detector of claim 17, wherein the control signal is a signal on a bus that specifies whether the bus has a valid data or address.

19. The glitch detector of claim 17, wherein the initializer comprises a D-type flip-flop having an input terminal operatively coupled to receive the control signal.

20. The glitch detector of claim 19, wherein the D-type flip-flop outputs a synchronized control signal corresponding to the control signal synchronized by a clock signal changing from a first logic level to a second logic level.

21. The glitch detector of claim 17, wherein the double edge detector comprises a first flip-flop having an input terminal set to one logical state, a clock input terminal to receive the strobe signal and a clear input coupled to receive a reset signal from the initializer, and a second flip-flop having an input terminal coupled to an output terminal of the first flip-flop and a clock input terminal to receive the strobe signal.

* * * * *